Figure 1:
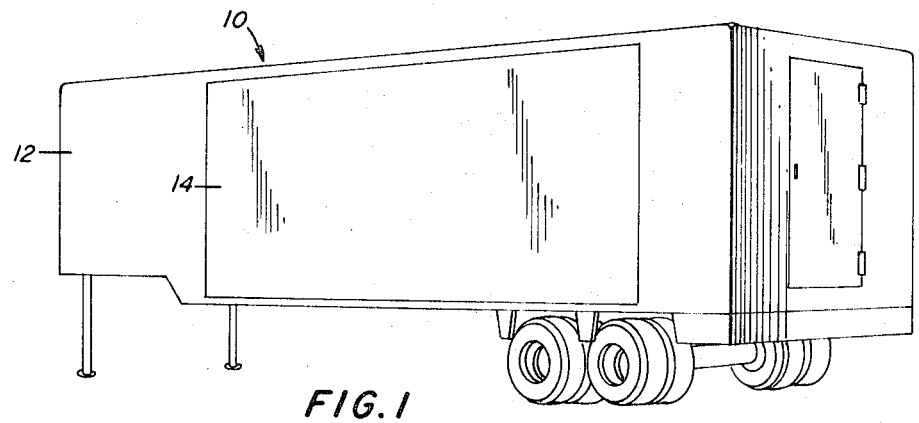

Sept. 19, 1967  H. W. BROSIG  3,341,986
LEVELLING DEVICE

Filed March 15, 1965  3 Sheets-Sheet 1

INVENTOR
HEINZ BROSIG
BY *Albert W. Hilburger*
ATTORNEY

Sept. 19, 1967  H. W. BROSIG  3,341,986
LEVELLING DEVICE

Filed March 15, 1965  3 Sheets-Sheet 2

INVENTOR
HEINZ BROSIG though such a device, employing the inventive principle, could be utilized with a single expansible side. The invention is useful wherever it is desirable or necessary to maintain alignment between a pair of coacting elements during and following relative movement between them.

United States Patent Office
3,341,986
Patented Sept. 19, 1967

3,341,986
LEVELLING DEVICE
Heinz W. Brosig, Rockville, Md., assignor to Brosig, Hilburger, and Hall, McLean, Va., a partnership
Filed Mar. 15, 1965, Ser. No. 439,551
5 Claims. (Cl. 52—67)

This invention relates generally to a device which assures alignment between a pair of coacting elements during and following relative movement between them. While the invention herein is not to be so limited, the structure described relates specifically to a trailer having expansible and retractable sides wherein it is imperative that the sides maintain a fixed attitude relative to the main frame of the trailer during and following their movement and regardless of the size of the load carried.

Heretofore, vehicles with expansible sides have been designed and built, but they have employed heavy, complicated, unwieldy, and expensive means to maintain the sides in an upright attitude when in the extended position. These structures have taken the form of legs, jacks, brackets, and complex pulley-cable arrangements. It was to avoid such structures as these that the present invention was conceived.

Accordingly, it is an object of this invention to provide a device which will maintain a fixed attitude or relationship between two coacting bodies as one is moved relative to the other.

It is a further object of this invention to provide a trailer with expansible and retractible side bodies which will maintain parallelism between the side bodies and the main frame during and following the expansion/retraction operation.

It is a still further object of this invention to provide a strong, yet simple, method for maintaining the plumb of a heavy cantilevered structure as it moves from one position to another.

Yet a further object of this invention is to provide a device for maintaining the plumb of a heavy cantilevered structure, which device can be adjusted to vary the attitude of the cantilevered structure with respect to the supporting or main structure.

Still a further object of the invention is to provide flexible means secured at each end to the main or supporting structure which engage a moving supported structure to maintain the plumb of the supported structure throughout its cantilevered movement.

An additional object of this invention is to provide a device which will prevent relative angular rotation between two coacting bodies during the translating movement of one relative to the other.

Other and additional objects and advantages of the invention will become apparent upon a reading of the description that follows together with the accompanying drawings which should be considered as illustrating, but in no way limiting, the present invention. Those features which are considered characteristic of our invention will be set forth in the appended claims.

Figure 2:
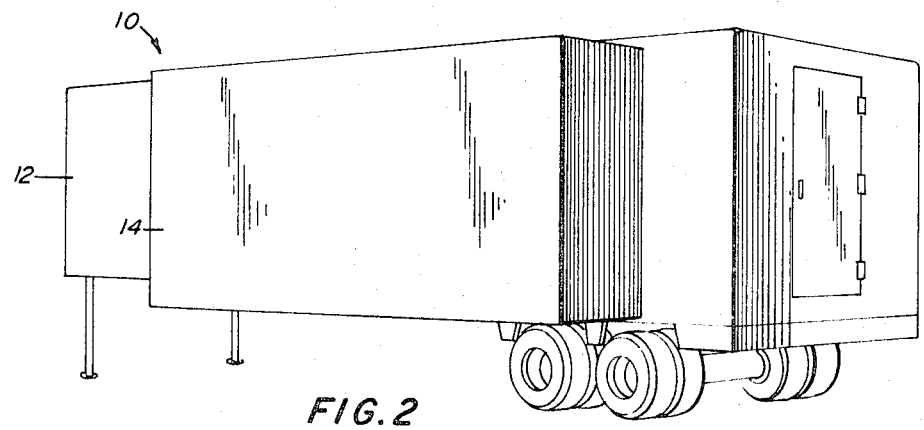
Figure 3:
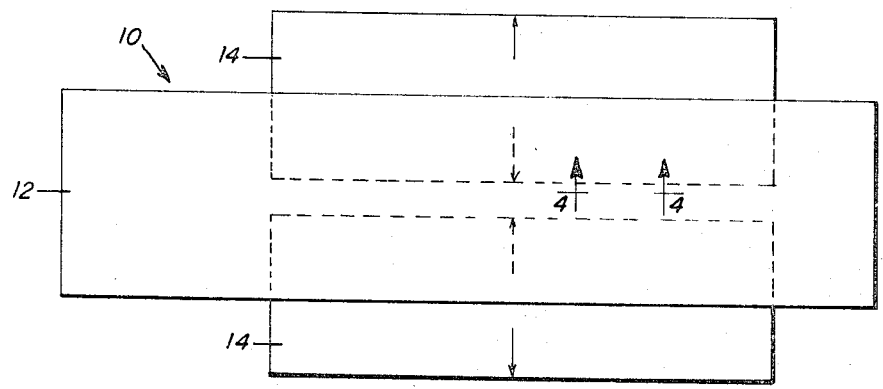
Figures 4, 5:
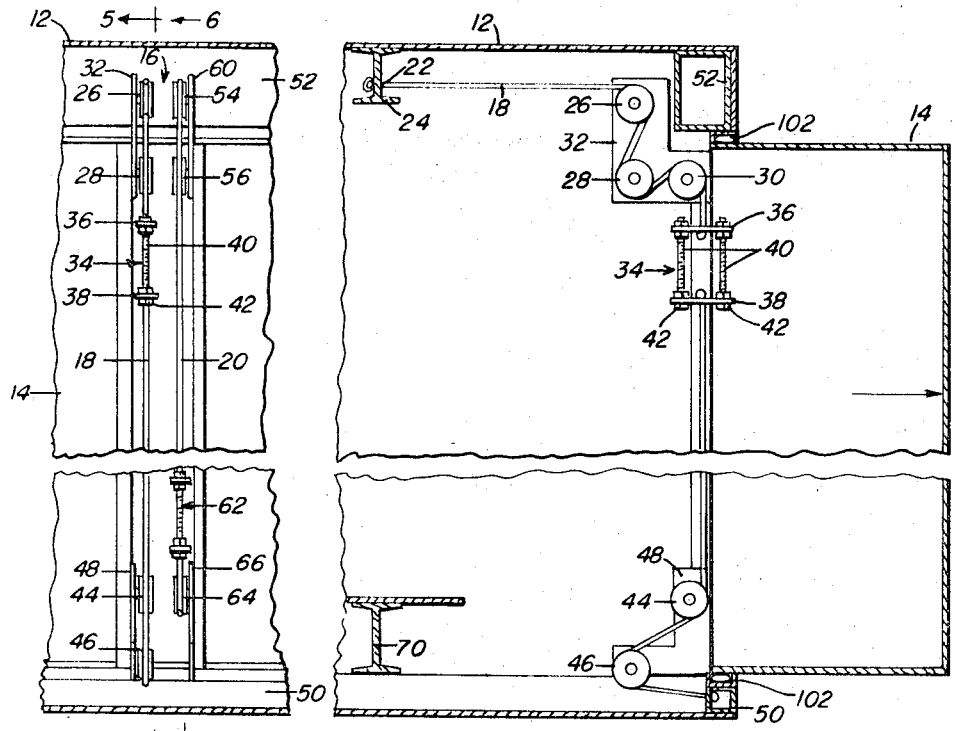
Figures 6, 7:
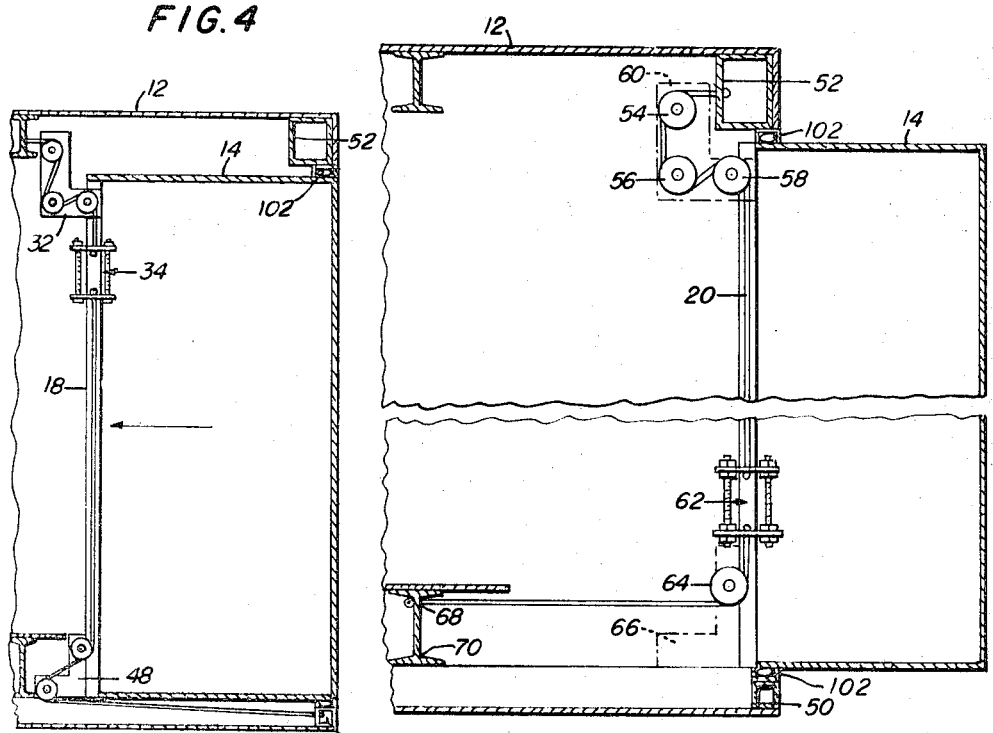
Figure 8:
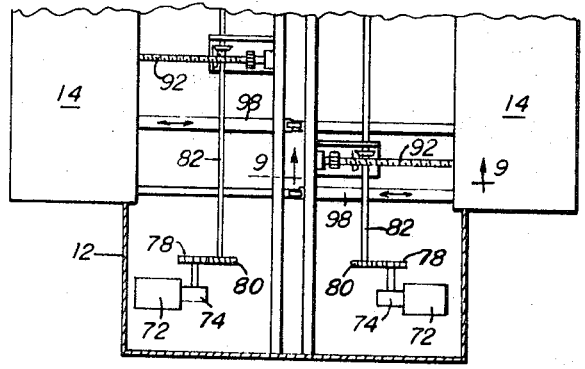
Figure 9:
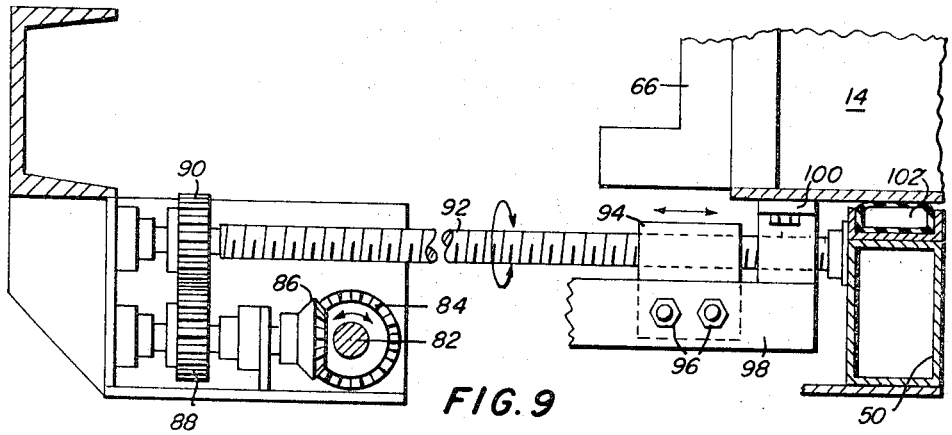
Figure 10:
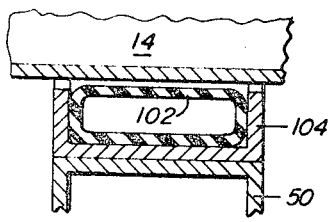
Figure 11:
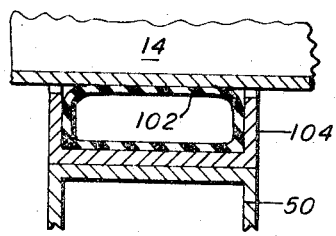

In the drawings:
FIGURE 1 is a view in perspective of a typical trailer which embodies the expansible-side feature of this invention;
FIGURE 2 is a view in perspective showing the expansible side in its extended position;
FIGURE 3 is a top plan view of the trailer showing both expansible sides in their extended positions;
FIGURE 4 is a cut away view taken along lines 4—4 of FIGURE 3 and illustrates in detail the main feature of the invention;
FIGURE 5 is a cut away view taken along line 5—5 of FIGURE 4;
FIGURE 6 is a cut away view taken along lines 6—6 of FIGURE 4;
FIGURE 7 is a cut away view similar to that illustrated in FIGURE 5, but showing the expansible side retracted into the trailer body;
FIGURE 8 is a top plan view, cut away, to show a typical mechanism for expanding and retracting the sides of the trailer;
FIGURE 9 is a cut away view taken along lines 9—9 of FIGURE 8;
FIGURE 10 is a cross section view showing an inflatable air seal in its deflated condition;
FIGURE 11 is a cross section view showing the inflatable air seal of FIGURE 10 in its inflated, thereby sealing, condition.

Referring now to the drawings, FIGURE 1 illustrates generally a trailer 10 employing the levelling device which is the invention set forth herein. The trailer 10 includes a main body 12 and a pair of side bodies 14. The latter are movable, by means of a mechanism to be described below, from a flush or retracted position indicated in FIGURE 1 to a fully extended position as illustrated in FIGURES 2 and 3.

The side bodies 14 are preferably fully enclosed when in the extended position shown in FIGURE 2 such that the interior space defined by the walls, floor, and ceiling of the side bodies compliments and adds to the interior space of the main body 12. Trailers employing expansible sides are not new to the art. What is new and set forth as the invention claimed herein is the novel device which prevents drooping or sagging of the sides during the process of extension, and afterwards. Levelling devices have been known heretofore, but these have been heavy, complicated, unwieldy, and expensive structures. The articles of the prior art usually took the form of legs, jacks, brackets, and complex pulley-cable arrangements.

In contrast, the levelling device presented herein is self-contained within the trailer structure, is uncomplicated in design, entails nominal expense, and performs its duty continuously, regardless of the relative positions of main body and side bodies, that is, the degree of extension of the side bodies from the main body. Furthermore, regardless of the amount of tilt of the main body, the side bodies will retain their desired relationship relative to the main body. With the levelling device of this invention, it is possible to extend and retract the side bodies without regard to the attitude of the main body.

FIGURE 4 illustrates specific details of the levelling device to be described, and is complemented in this regard by FIGURES 5, 6, and 7. The levelling device 16 includes a pair of flexible elements 18 and 20. These flexible elements may be of any suitable material, as for example, wire, rope, cabling, chain, belting, etc. It is seen that element 18 is secured at one end 22 to a centrally disposed structural member 24 of the main body, then passes over pulleys 26, 28, and 30 (which may just as easily take the form of other rotating engagement devices such as sprockets, etc.). The pulleys are rotatably mounted on a mounting plate 32 which is an extension of side body 14.

Flexible element 18 is interrupted by adjustment mechanism 34 which is illustrated as includnig a pair of spaced-apart plates 36 and 38 designed to receive therethrough a pair of bolts or studs 40. The studs or bolts 40 can be fastened to the plates 36 and 38 by means of nuts 42. The specific adjustment mechanism 34 shown is not critical to this invention, but may take any form compatible with the general design.

Continuing from adjustment means 34, flexible element 18 passes over pulleys 44 and 46 which are mounted for rotation on mounting plate 48, which like element 32 is an extension of side body 14. Element 18 terminates at and is suitably fastened to a structural member 50 of the main body which is disposed at a location outermost from the longitudinal centerline of the trailer.

Flexible element 20 follows a path generally similar to that of element 18, except that it is attached at the top to an outermost structural member of the main body and at the bottom to an innermost member. Following its path in detail, member 20 is fastened to an outermost structural member 52 of the main body. Member 20 passes over pulleys 54, 56, and 58 which are rotatably mounted on mounting plate 32 which is an extension of side body 14.

As in the instance of flexible member 18, member 20 is interrupted by an adjustment mechanism 62 (similar to adjustment mechanism 34) then continues about pulley 64 rotatably mounted on plate 66 which like element 32 is an extension of side body 14. The flexible member 20 is seen to terminate as at 68 where it is suitably fastened to a structural member 70 which is located substantially centrally of the main body.

FIGURE 7 is a showing identical to that of FIGURE 5 except that in the former illustration the side body 14 is fully extended and in the latter illustration, side body 14 is fully retracted.

A schematic showing of one type of mechanism for expanding and retracting the side bodies 14 is presented in FIGURE 8, although such a mechanism may take any other suitable and desirable form. A motor 72 drives a gearbox 74, which through shaft 76 drives pinion 78. In engagement with pinion 78, pinion 80 drives shaft 82, bevel gear 84, bevel gear 86, pinion 88, pinion 90, thence worm gear 92. A large nut 94 is in engagement with worm gear 92 and is fastened as at 96 to support member 98. Side body 14 is fastened as at 100 to support member 98. Therefore, it is readily seen that as motor 72 rotates drive shaft 82, worm gear 92 is rotated thereby advancing or withdrawing support member 98, and with it side body 14. It is also readily seen that flexible members 18 and 20 which are fastened at their ends to main body 12 are in continuous engagement with members 26, 28, 30, 44, 46, 54, 56, 58, and 64, all mounted for rotation on side body 14.

It has been seen that the side bodies 14 move in and out with respect to main body 12 and that they rest on support member 98. Hence, any sag of a side body 14 due to its cantilevered weight would entail primarily a rotation about the point indicated at 100. Should an adjustment be made in order to "square" or line up the side bodies with respect to the main body, this would be performed by means of adjustment mechanisms 34 and 62 while the side bodies are in their outermost position. By screwing elements 36 and 38 of adjustment mechanism 34 together, thereby increasing the tension in flexible element 18, it will be seen that the side body 14 will be caused to rotate counterclockwise as seen in FIGURE 5, while decreasing the tension in flexible element 18 will cause a rotation in the clockwise direction.

In a similar manner, tightening of the tension in flexible element 20 (via adjustment mechanism 62) will cause a clockwise rotation as seen in FIGURE 6, while relaxing the tension in flexible element 20 will cause a rotation in the counterclockwise direction.

Apparatus to seal the interior of the trailer is illustrated in FIGURES 10 and 11. Secured to each frame member 50 of the main body is a channel member 104 which supports and contains a bladder or expansible tube 102 which may be made of any suitable flexible and expansible (or inflatable) material. Seal 102, shown in the uninflated condition in FIGURE 10, is connected to the trailer's air supply such that it can be selectively inflated by the operator to the condition shown in FIGURE 11. In the latter condition, the seal 102 bears tightly against side body 14 thereby preventing passage of fluids between the interior and the exterior of the trailer body; in other words, the seal serves to hermetically seal the interior of the trailer from the exterior thereof.

The sealing apparatus can be activated regardless of the degree of extension of the side bodies with respect to the main body, except that a safety device is preferably provided which would prevent activation of the sealing apparatus while the side walls are in active transit from one position to another.

From the foregoing it has been seen that the invention described sets forth an arrangement which assures parallelism between a pair of coacting and co-engaging members. Furthermore, the mechanism which achieves this desirable end is economical, light in weight, uncomplicated, and is fully contained within the trailer's structure. In addition the levelling device disclosed herein is operable to continuously prevent sag or droop of the secondary (or side) body relative to the primary (or main) body without regard to the attitude of the primary body.

While particular embodiments of the present invention have been shown and described, it will be obvious to those skilled in the art that changes and modifications may be made without departing from this invention in its broader aspects, and thereupon, the aim in the appended claims is to cover all such changes and modification as fall within the true spirit and scope of this invention.

What is claimed is:
1. Levelling apparatus comprising:
 a main body having an opening in the sidewall thereof, upper and lower anchor means in said main body proximate to said sidewall, upper and lower anchor means in said main body spaced inwardly from said sidewall, a side body telescopically movable relative to said main body in said opening between a contracted position and an expanded position, means for supporting said side body on said main body, a first non-extensible elongated flexible element extending from said upper anchor means proximate to said sidewall to said lower anchor means spaced inwardly therefrom, and a second non-extensible elongated flexible element extending from said lower anchor means proximate to said sidewall to said upper anchor means spaced inwardly therefrom, rotatable guide means on said side body engageable respectively with said first and second elements to maintain a constant angular relationship between said side body and said main body.

2. The levelling apparatus set forth in claim 1 including drive means for moving said side body relative to said main body.

3. The levelling apparatus set forth in claim 1 including adjustment means associated with each of said elements to vary the respective lengths thereof.

4. The levelling apparatus set forth in claim 1 wherein said first and second elements lie in spaced apart, substantially parallel planes.

5. The levelling apparatus set forth in claim 1 including sealing means disposed between said main body and said side body to provide an airtight closure therefor.

References Cited

UNITED STATES PATENTS

| | | | |
|---|---|---|---|
| 2,150,615 | 3/1939 | Sword | 296—26 |
| 2,667,440 | 1/1954 | Wotring | 312—331 |
| 2,820,666 | 1/1958 | Grochnal. | |

BENJAMIN HERSH, *Primary Examiner.*

P. GOODMAN, *Assistant Examiner.*